Dec. 6, 1932.  L. S. HAFNER ET AL  1,890,257
TRUCK BODY CONSTRUCTION
Filed Aug. 15, 1929  4 Sheets-Sheet 1

INVENTORS
Louis S. Hafner and
Edward H. Hautz
BY Fay, Oberlin & Fay
ATTORNEYS

Dec. 6, 1932.    L. S. HAFNER ET AL    1,890,257
TRUCK BODY CONSTRUCTION
Filed Aug. 15, 1929    4 Sheets-Sheet 2

INVENTORS
Louis S. Hafner and
Edward H. Hautz
BY
Fay, Oberlin & Fay ATTORNEYS

Dec. 6, 1932.　　　L. S. HAFNER ET AL　　　1,890,257
TRUCK BODY CONSTRUCTION
Filed Aug. 15, 1929　　　4 Sheets-Sheet 3

INVENTORS
Louis S. Hafner and
BY Edward H. Hautz
Fay, Oberlin & Fay
ATTORNEYS.

Dec. 6, 1932.   L. S. HAFNER ET AL   1,890,257
TRUCK BODY CONSTRUCTION
Filed Aug. 15, 1929    4 Sheets-Sheet 4
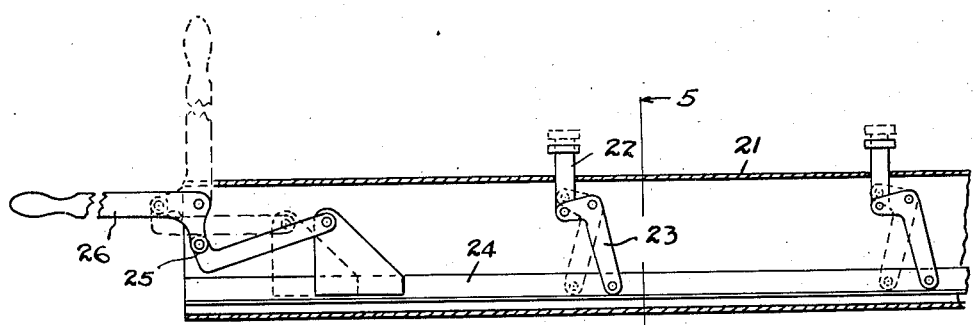
Fig. 4
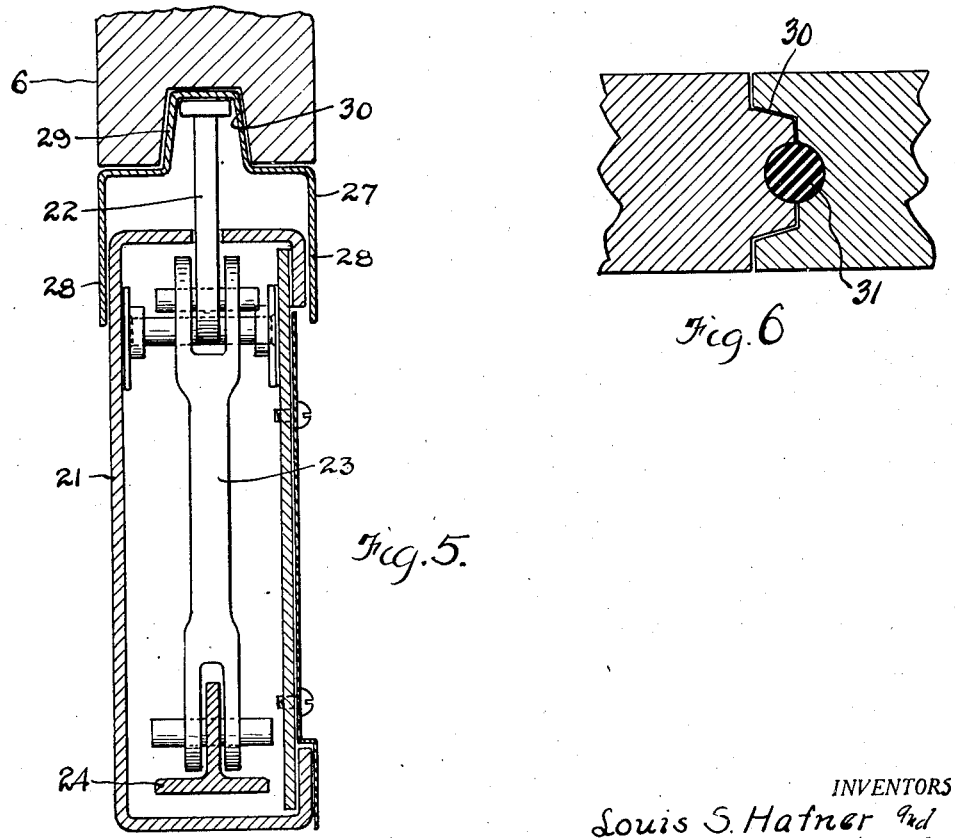
Fig. 5.
Fig. 6
INVENTORS
Louis S. Hafner and
BY Edward H. Hautz
Fay, Oberlin & Fay
ATTORNEYS Patented Dec. 6, 1932

1,890,257

UNITED STATES PATENT OFFICE

LOUIS S. HAFNER AND EDWARD H. HAUTZ, OF LAKEWOOD, OHIO

TRUCK BODY CONSTRUCTION

Application filed August 15, 1929. Serial No. 386,123.

The present invention relates to delivery trucks, more particularly to a truck body which is adaptable for use with removable racks, the body providing a pair of wide opening rear doors whereby the racks may easily be moved in and out, and also a series of sliding doors along the sides of the body, these doors being of such a size that any of the open ends of the racks may be readily accessible with a minimum amount of door opening.

More particularly the present construction is adapted for use with truck bodies of the refrigerating type where the racks may be loaded with the commodities in refrigerating storage buildings and moved bodily into the trucks, the small sliding doors affording easy access to the racks, but limiting the amount of opening to as small an area as possible so as to help maintain the refrigerating temperature of the truck itself.

In addition means are provided for sealing and locking the sliding doors in their closed position and for easy opening and closing of the same. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 1:
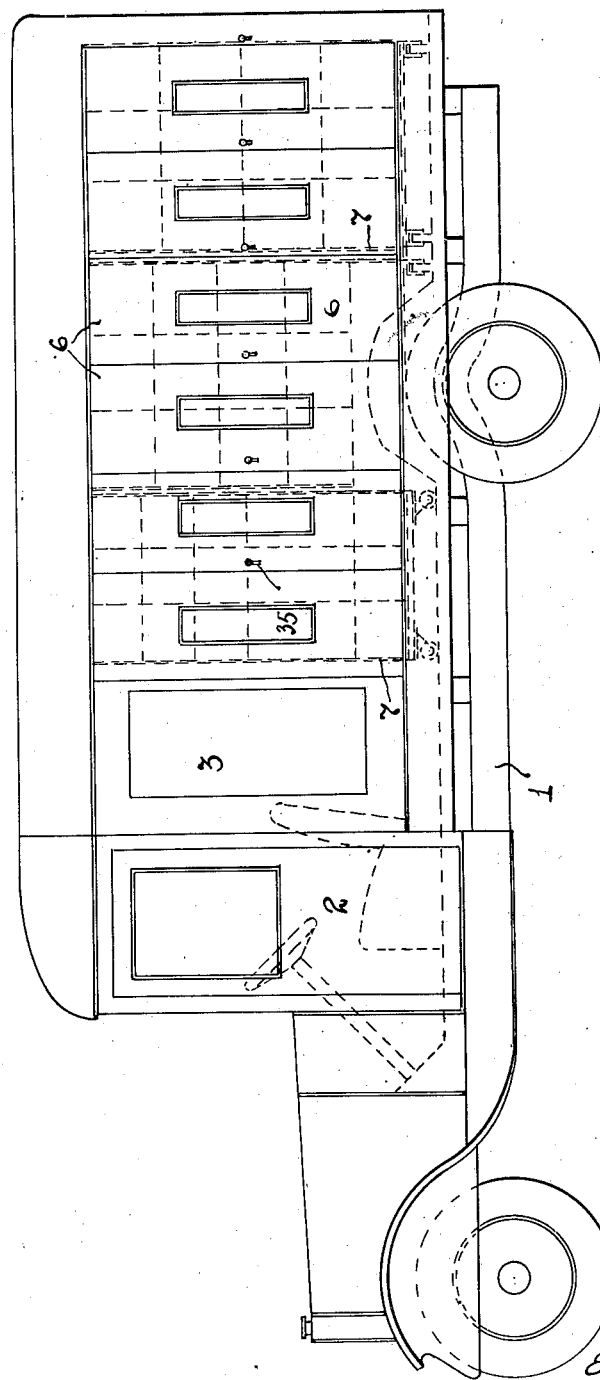
Figure 2:
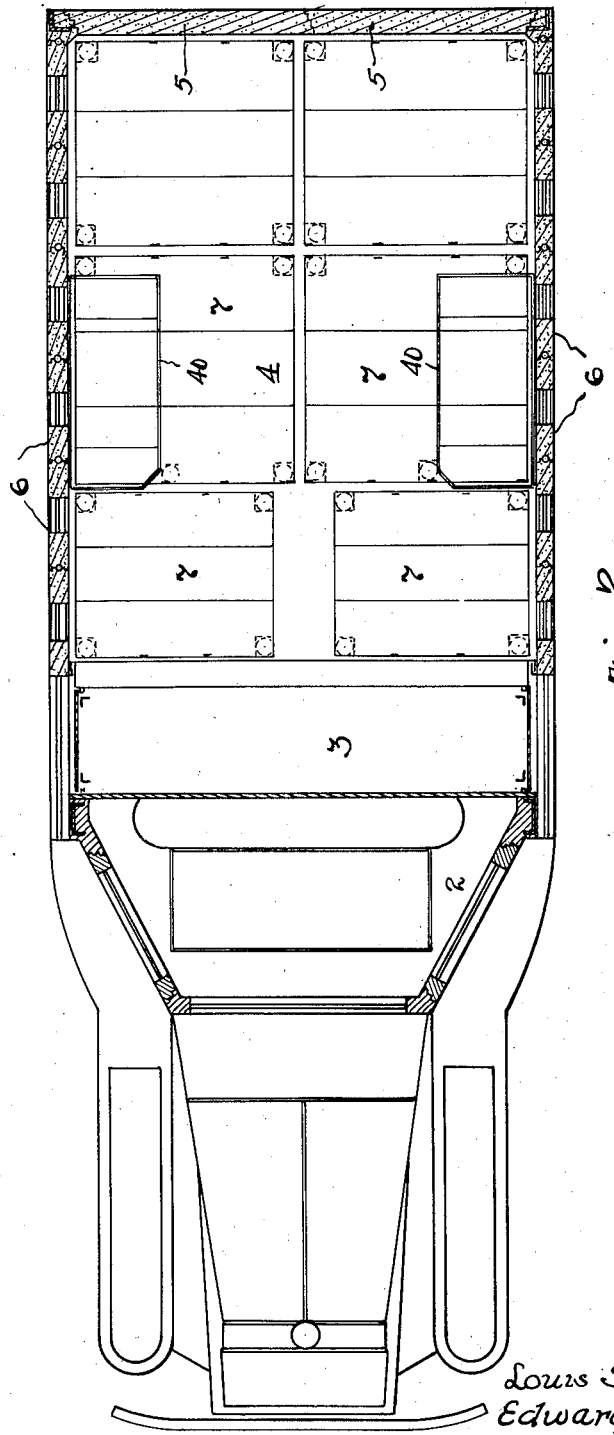
Figure 3:
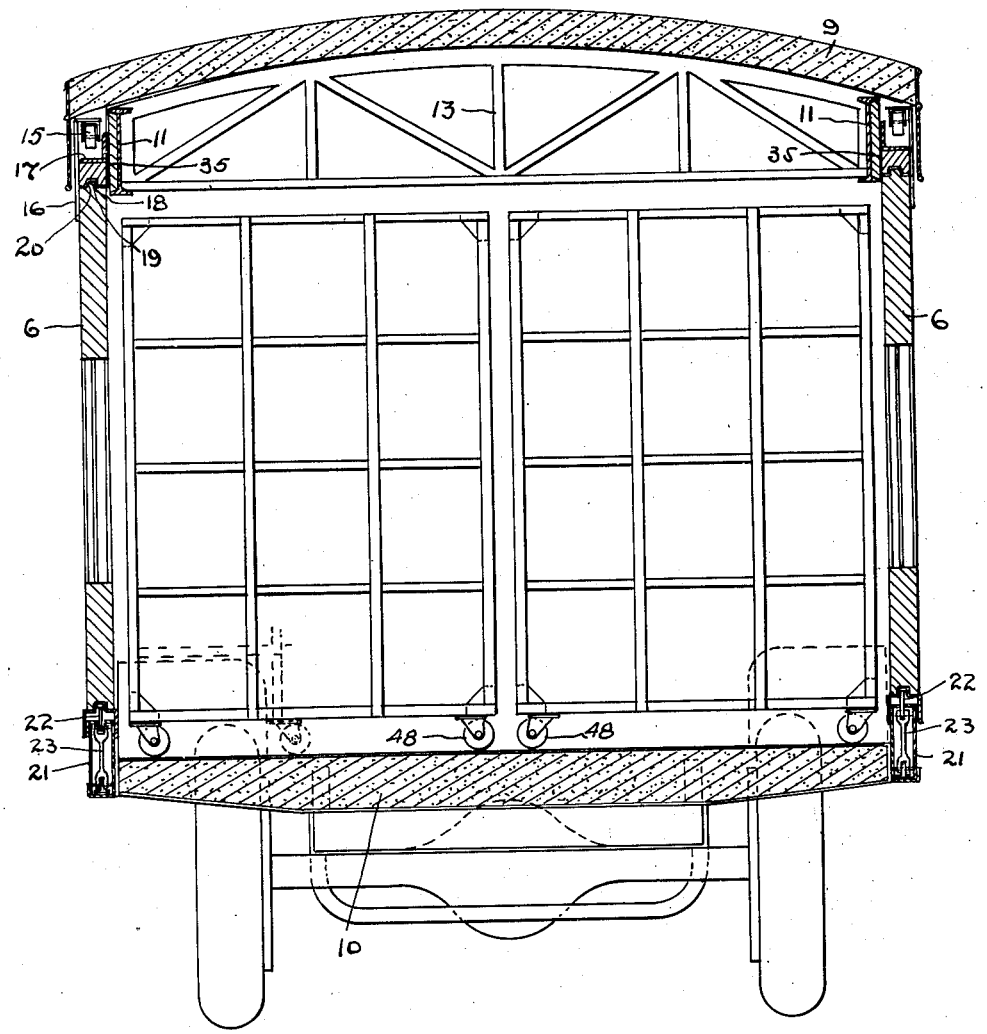

In said annexed drawings:

Fig. 1 is a side elevational view of a truck showing the improved body construction; Fig. 2 is a horizontal sectional view through the body showing the racks in plan; Fig. 3 is a vertical sectional view through the body; Fig. 4 is a side elevational view of the door-sealing mechanism; Fig. 5 is a sectional view on the line 5—5 of Fig. 4; and Fig. 6 is a fragmentary section through a portion of a pair of the sliding doors.

The present truck consists of the usual chassis 1 on which is mounted the special truck body consisting of a cab portion 2 and a closed-in compartment 3 just to the rear thereof, which compartment is adapted to contain a refrigerating or cooling medium of any desired type. To the rear of this the truck body consists of a closed body 4 which is provided with a pair of wide opening rear doors 5, and a series of slidably mounted side doors 6.

As shown in Fig. 2, the interior of the truck body is adapted to be filled by a series of racks 7, there being six shown, of such size and shape as to substantially fill the interior of the truck body, the shelves 8 of these racks being of varying widths to accommodate such commodities as will be handled thereon. The upper part of the truck body provides a solid roof, or supporting structure 9, which extends down part way over the sides, thus stiffening the body structure as a whole, and providing the necessary supporting means for the sliding doors along the sides of the truck. As is illustrated, the doors both rear and side are shown as being of the insulated type, that is, of a type suitable to maintain a low temperature with the least amount of heat transfer.

As shown in Fig. 3, the bottom 10 of the truck is likewise formed of an insulating material as is the top of the same which, as shown, is provided with two longitudinally extending I-beams 11 to give the necessary rigidity as well as with a series of transversely extending built-up girders 13 to form a sufficiently rigid structure to maintain itself under the racking of road use.

The sliding doors 6 each carry preferably a pair of rollers 15, these rollers being carried by upwardly extending L-shaped supporting members 16, and are thus adapted to engage and roll along a track-way 17 which is formed at the top of the truck and carried by the top. This track-way is provided with insulation material and is formed at the bottom with a groove 18 which has its outer wall 19 beveled slightly or extending inwardly and the inner wall substantially vertical to receive a similarly shaped tongue 20 formed on the upper edge of each sliding door 6. The operating and sealing mechanism is mounted along the sides of the truck at the bottom and is carried by the truck chassis or the bottom portion, that is, the floor of the truck, and consists of a box-like member 21 in which are mounted a series of lifting feet 22 which extend through the upper edge of the box, and which are operated by a series of bell-cranks 23, all of which are connected to a longitudinally extending operating bar 24 which, at the forward end of the truck, is connected to a suitable operating bell-crank lever 25, of which the handle 26 is mounted on the cab of the truck.

Mounted over the lifting feet and extending longitudinally along the box is a lifting and sealing member 27 which has two downwardly extending side walls 28, and a top portion provided with an upwardly extending tongue 29 into which the feet extend, this member being slidable over the box and having the tongue 29 extending into complementary shaped grooves 30 along the bottoms of the sliding doors.

In operating the doors, when it is desired to lock and seal the same in position, a lever 25 is moved to the upright position, as shown in Fig. 4, at which time the feet 22 are all raised, thus forcing the doors upwardly and lifting them off the track-way at the top, while at the same time the tongue at the top of the door is forced into the groove, and thus the door is cammed slightly inwardly, as well as being raised to afford a tight seal with the top strip along the body. To release the doors, the hand lever 25 is moved into a horizontal position, as shown in full lines in Fig. 4, thus dropping the lifting feet and allowing the doors to move downwardly until the rollers are supported on the trackway 17, at which time the doors 6 may be rolled along so that any door may be opened, and the doors are moved forwardly along the sides of the truck in the space opposite the refrigerating compartment, this space preferably being long enough to receive more than one door, or at least of a length equal to or slightly greater than the greatest width of any shelf of the racks, so that a full shelf opening of any rack may be easily obtained. The engaging edges of the doors are preferably formed with similar grooves 30, one of which carries a sealing strip 31 of rubber, felt, or the like, which seats and is compressed in the groove 30 in the other door edge, as best shown in Fig. 6, and lock means 33 between doors are provided to maintain the edges of the doors in their sealed relation. The felt packing or sealing strips 35 may be employed at the top and ends of the doors so as to aid in obtaining a tight seal, and such material also aids in eliminating rattles and noise in the body due to racking movements.

Any suitable sealing means for the doors may be employed, the object being to provide means for sealing the doors against the truck body and to provide for moving the doors to an easy sliding position.

As best shown in Fig. 3, the racks 7 are mounted on caster wheels 8 so as to be easily movable into and out of the rear doors of the truck and thus are divided up into a series of shelves or compartments of suitable size to receive the different types of commodities which the truck is particularly adapted to handle. In the particular form illustrated it will be noticed, as shown in Figs. 1 and 2, that the two forward racks are of such a size that they may be rolled in from the rear and moved into position around the raised floor portion 40 of the body over the rear wheels and the center two racks are so formed as to overlie these raised floor portions at the wheels, but the particular shape and construction of the racks will, of course, be suited to the particular type of truck chassis employed and if the truck chassis used has a straight frame, the racks might be of the same size and entirely interchangeable.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:

1. In a delivery truck, the combination which comprises a truck body, a trackway along one side of the body top, a plurality of side doors mounted for sliding movement along said trackway, a groove in said trackway and a tongue on said doors, and means carried by said truck body adapted to raise said doors off said trackway and cause said tongues to fit tightly into said grooves.

2. In a delivery truck, the combination which comprises a truck body, a trackway along one side of the top of said body, a plurality of side doors mounted for sliding movement along said trackway, and unitary means carried by said truck body and operable from the driver's cab of said truck for simultaneously raising said doors to prevent movement thereof, and to seal the same against said truck body.

Signed by us this 30 day of July, 1929.

LOUIS S. HAFNER.
EDWARD H. HAUTZ.